United States Patent
Gligor et al.

(10) Patent No.: US 10,235,515 B2
(45) Date of Patent: Mar. 19, 2019

(54) METHOD AND APPARATUS FOR ON-DEMAND ISOLATED I/O CHANNELS FOR SECURE APPLICATIONS

(71) Applicant: Carnegie Mellon University, Pittsburgh, PA (US)

(72) Inventors: Virgil D Gligor, Pittsburgh, PA (US); Zongwei Zhou, Mountain View, CA (US); Miao Yu, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 157 days.

(21) Appl. No.: 15/129,548

(22) PCT Filed: May 15, 2015

(86) PCT No.: PCT/US2015/031083
§ 371 (c)(1),
(2) Date: Sep. 27, 2016

(87) PCT Pub. No.: WO2015/175942
PCT Pub. Date: Nov. 19, 2015

(65) Prior Publication Data
US 2017/0177854 A1    Jun. 22, 2017

Related U.S. Application Data

(60) Provisional application No. 61/996,834, filed on May 15, 2014.

(51) Int. Cl.
*G06F 21/44* (2013.01)
*G06F 21/57* (2013.01)
*G06F 21/53* (2013.01)
*G06F 9/455* (2018.01)

(52) U.S. Cl.
CPC .......... *G06F 21/44* (2013.01); *G06F 9/45558* (2013.01); *G06F 21/53* (2013.01); *G06F 21/57* (2013.01); *G06F 21/572* (2013.01); *G06F 2009/45579* (2013.01); *G06F 2009/45587* (2013.01); *G06F 2221/034* (2013.01); *G06F 2221/2141* (2013.01); *G06F 2221/2145* (2013.01)

(58) Field of Classification Search
CPC ...... G06F 21/44; G06F 9/45558; G06F 21/53; G06F 21/572; G06F 2009/45579; G06F 2009/45587; G06F 2221/034; G06F 2221/2141
See application file for complete search history.

(56) References Cited

U.S. PATENT DOCUMENTS

| | | | |
|---|---|---|---|
| 7,293,070 B2 | 11/2007 | Moses et al. |
| 8,176,554 B1 | 5/2012 | Kennedy |
| 8,627,414 B1 | 1/2014 | McCune et al. |

(Continued)

OTHER PUBLICATIONS

Li et al., "Research and Application of USB Filter Driver Based on Windows Kernel", Apr. 2010, Third International Symposium on Intelligent Information Technology and Security Informatics, pp. 438-441 (Year: 2010).*

*Primary Examiner* — Kenneth W Chang

(57) ABSTRACT

A computing platform for on-demand I/O channels, which enable secure application to dynamically connect to diverse peripheral devices of untrusted commodity OSes.

17 Claims, 5 Drawing Sheets

(56) References Cited

U.S. PATENT DOCUMENTS

| | | | |
|---|---|---|---|
| 2003/0037237 A1* | 2/2003 | Abgrall | G06F 21/53 |
| | | | 713/166 |
| 2007/0067435 A1* | 3/2007 | Landis | G06F 9/5016 |
| | | | 709/224 |
| 2009/0249065 A1* | 10/2009 | De Atley | G06F 21/51 |
| | | | 713/164 |
| 2010/0031325 A1* | 2/2010 | Maigne | G06F 9/45533 |
| | | | 726/4 |
| 2012/0331550 A1* | 12/2012 | Raj | G06F 21/53 |
| | | | 726/22 |

\* cited by examiner

METHOD AND APPARATUS FOR ON-DEMAND ISOLATED I/O CHANNELS FOR SECURE APPLICATIONS

RELATED APPLICATIONS

This application is a national phase filing under 35 U.S.C. § 371 of PCT Application No. PCT/US15/31083, filed May 15, 2015, which claims the benefit of U.S. Provisional Application No. 61/996,834, filed May 15, 2014.

GOVERNMENT INTEREST

This invention was made with government support under National Science Foundation CCF-0424422. The government has certain rights in this invention.

BACKGROUND OF THE INVENTION

To tolerate the malware and vulnerabilities in large and complex commodity operating systems (OSes), modern secure architectures isolate secure applications (SecApps) from OSes, thereby enabling their safe co-existence. However, safe co-existence does not guarantee the viability and usefulness of the SecApps.

Two fundamental causes of this problem are: (1) To be trustworthy, SecApps must be formally verified, hence small and simple. Thus, they cannot include a variety of basic services available only in large and untrustworthy commodity systems, such as persistent storage, file systems, networking services, and isolated device I/O; and (2) among these services, providing on-demand isolated I/O channels to secure applications is particularly important and challenging, to improve the secure applications' usefulness and viability. Examples include providing secure user interfaces for human-application communication (e.g., keyboard input, screen output), or enabling secure control of remote devices and critical infrastructure (e.g., surveillance cameras, unmanned drones, network-connected electricity generators).

Modern architectures can isolate security-sensitive application code from the untrusted code of commodity platforms, enabling their safe co-existence. This is necessary because large untrustworthy software components will certainly continue to exist in future commodity platforms. Competitive markets with low cost of entry, little regulation, and no liability will always produce innovative, attractively priced, large software systems comprising diverse-origin components with uncertain security properties. Thus, the best one can hope for is that some trustworthy software components can be protected from attacks launched by adversely-controlled giants. To be trustworthy, software components must be verified, and to be verified they must be comparatively small, simple, and limited in function. In contrast to the giants, these software components are wimps.

Unfortunately, isolating these security-sensitive SecApps from untrusted giants does not guarantee the ability of the SecApps to survive on commodity platforms. To avoid re-creating giants inside their isolated execution environments (IEEs), SecApps often give up a variety of basic services for application development, which greatly undermines their usefulness and viability. For example, SecApps typically lack persistent memory, file system and network services, flexible trusted paths to users, and I/O services needed for many applications; e.g., in industrial control, finance, health care, and defense.

Past multi-year efforts to restructure giants (e.g., commercial OSes) to provide trustworthy services for applications led to successful research but failed to deliver trustworthy OSes that met product compatibility and timeliness demands of competitive markets. The alternative of including basic services in the trusted computing bases (TCBs) that guarantee safe giant-wimp co-existence has been equally unattractive. TCBs include, for example, security kernels, microkernels, and exokernels, virtual machine monitors, micro-hypervisors, and separation/isolation kernels. TCBs would lose assurance because they would become bloated, unstable, and unverifiable; i.e., they would use large and complex code bases of diverse, uncertain origin (e.g., device drivers) needed for different applications, and require frequent updates because of function additions, upgrades, and patches.

Thus, the only remaining option is to place basic application services in the giants. To survive, SecApps would have to rely on giant-provided services but only after efficiently verifying their results. In turn, SecApps could make their own isolated services available to giants for protection against persistent threats. Continuing with the wimp-giant metaphor, trustworthy SecApps must engage in a carefully choreographed dance (i.e., secure composition) with untrustworthy giants.

Among the basic services needed by SecApps are on-demand isolated I/O channels to peripheral devices, especially character devices (other types of devices, networking and storage devices, can be simply isolated by data encryption). Past attempts to provide such services with high assurance on commodity systems, however, have been unsuccessful. Some provide isolated I/O channels within system TCBs but only for a few selected devices. Even limited support for few devices invariably increases the size and complexity of trusted code and undermines assurance. For example, including just the Linux USB bus subsystem in a micro-hypervisor would more than double its code-base size and increase its complexity significantly; e.g., it would introduce concurrency in serial micro-hypervisor code since it would require I/O interrupt handling. Other attempts statically allocate selected peripheral devices to isolated system partitions at the cost of losing on-demand (e.g., plug-and-play) capabilities of commodity systems. In contrast, other systems provide on-demand I/O capabilities by virtualizing devices or passing them through to isolated guest OSes, but sacrifice I/O channel isolation from the untrusted OSes. Further attempts to isolate I/O channels rely on special hardware devices equipped with data encryption capabilities to establish cryptographic channels to applications. This approach excludes commodity devices, which lack encryption capabilities, and adds TCB complexity by requiring secure key management for the special devices.

SUMMARY OF THE INVENTION

The present invention is a method and apparatus for on-demand I/O channels, which enables SecApps to dynamically connect to diverse peripheral devices of untrusted commodity OSes. Central to on-demand isolation of I/O channels is the notion of the trusted I/O kernel (TK). The TK is an add-on trustworthy service that is isolated from the untrusted OS by the underlying code isolation root-of-trust mechanism (underlying TCB). It executes at least at the same privilege level as, if not higher than, the OS. In some examples, the TK can include or be embodied as computer-readable instructions, processor micro-code, firmware and/ or hardware. It should be noted that in the present invention, the TK is less privileged than the underlying TCB. The TK constructs on-demand isolated I/O channels to SecApps, mediates all accesses of SecApps to I/O devices, and prevents the untrusted OS from interfering with SecApps' execution and I/O transfers, and vice-versa. The TK constructs isolated I/O channels without affecting the underlying TCB. The TK retains the size, complexity, security properties of the underlying TCB. For example, a mechanism to redirect the interrupts of the isolated devices to the TK was developed, thus no interrupt handling code is added to the underlying TCB. The TK removes a SecApp's direct interfaces to the underlying TCB. The TK minimizes the OS's interfaces to the underlying TCB by enabling efficient direct communications between the OS and the TK. Thus, future I/O function innovation that enhances the untrusted OS or SecApps would only affect the TK, leaving the underlying TCB unchanged.

The present invention minimizes the size and complexity of the TK, using two classic security engineering methods. First, the present invention outsources I/O subsystem functions to the untrusted OS, but only if the TK can verify that the execution of that code is correct. For example, the initialization and configuration of the entire PCI or USB bus hierarchy is done by the untrusted OS and handed over to the TK when the isolated I/O channels are needed. The TK verifies the hierarchy without enumerating each device. Note that the outsourced functions use the existing I/O code in the OS and plug-ins to the OS (e.g., loadable kernel modules), so does not require modifications to or re-compilation of the OS source code. Second, the present invention further minimizes the TK by de-privileging and exporting drive and driver-subsystem code to SecApps, and implementing TK checks that verify applications' use of the exported code. Exporting code requires identification and removal of all driver-code dependencies on the untrusted OS services (e.g., memory management, synchronization, kernel utility libraries), either because they become redundant in the new on-demand mode of operation or because they can be satisfied by the SecApps or TK. For example, synchronization functions that multiplex a device among different applications become redundant, since the present invention can guarantee the isolation and exclusive ownership of devices to a SecApp during its execution. Another example is that the wimpy kernel exports USB request-handling code to the SecApp and mediates the behavior of the exported code, i.e., sanity checks the security-sensitive fields of the USB request descriptors created by the SecApp. Using these two methods, significant code base reduction of the wimpy kernel was achieved to facilitate future formal verification to it. In one example, more than 99% of USB subsystem code was cut down from the TK.

DETAILED DESCRIPTION OF THE INVENTION

1. On-Demand Isolated I/O

Figure 1:
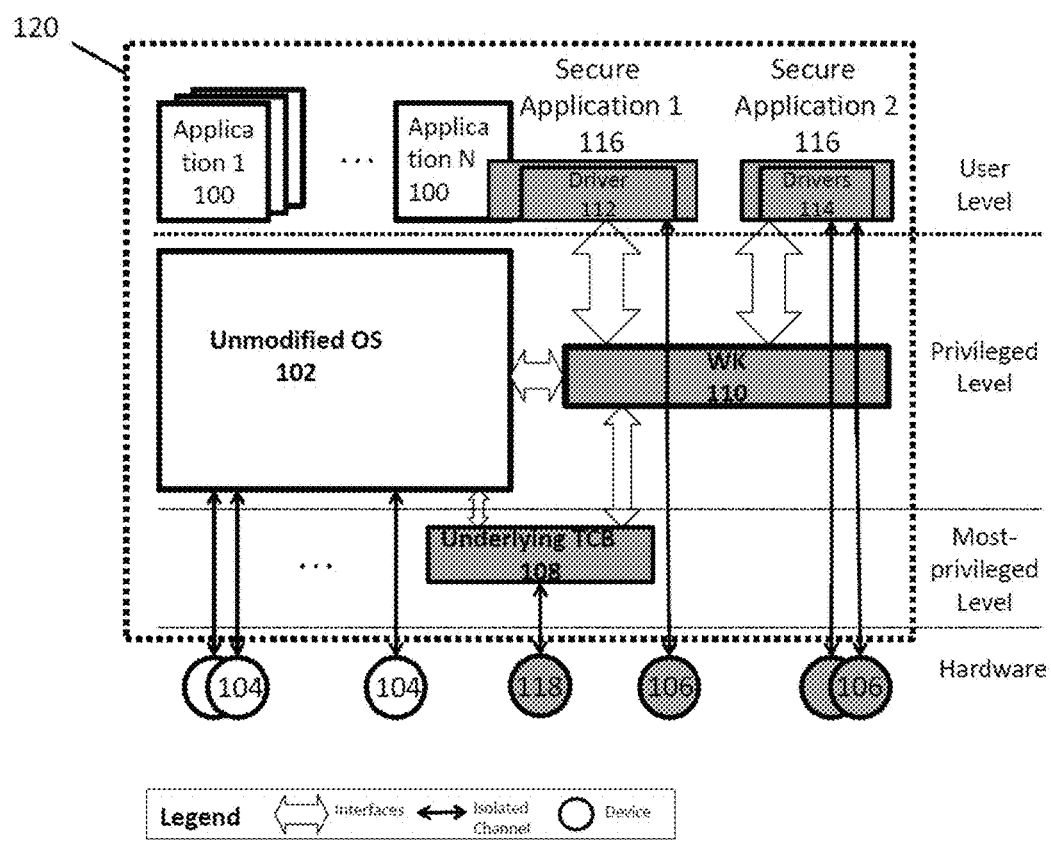
FIG. 1 shows an overview of the I/O isolation architecture, with the grey components representing the trusted code of SecApps.

This section outlines the advantages of the on-demand I/O channel isolation on commodity platforms in the wimp-giant model, describes the adversary model, and presents the inherent challenges posed by on-demand channel isolation.

In the on-demand I/O isolation model, the untrusted OS manages all commodity hardware resources and devices on the platform most of the time. However, when a security-sensitive application demands exclusive use of a device, the I/O isolation system takes control of necessary hardware communication resources from the untrusted commodity OS, verifies their OS configurations, and allocates them to the application. When the application is done with a channel, the system returns all resources used to the untrusted OS.

1.1 Advantages

The on-demand I/O isolation model has four significant advantages. First, it enables SecApps to obtain isolated I/O channels to any subset of a system's commodity devices needed during a session, not just to a few devices statically selected at system and application configuration. Cryptographically enabled channels, device virtualization, or pass-through of hardware devices become unnecessary.

Second, it enables trusted audit and control of physical devices without stopping and restarting applications, since all devices can be time-shared between trusted and untrusted applications. This makes it possible to maintain control of physical devices in long-running applications on untrusted commodity OSes; e.g., industrial process control, air-traffic control, and defense.

Third, it allows unmodified commodity OSes to have unfettered access to all hardware resources and preserve the entire application ecosystem unchanged. The relinquishing and reclaiming of hardware resources for on-demand I/O isolation is handled by non-intrusive OS plug-ins (e.g., loadable kernel modules), without requiring any OS re-design or re-compilation.

Fourth, it offers a significant opportunity for the reduction of the trusted I/O kernel size and complexity, and hence for enhanced verifiability. That is, the kernel can outsource many of its I/O functions to an untrusted OS and use them whenever it can verify the results of the outsourced functions correctly and efficiently. This opportunity is unavailable in either the static device allocation or virtualization models. In the former the OS cannot configure devices in SecApp partitions, and in the latter it does not have direct access to hardware devices.

1.2 Adversary Model

The present invention adopts the typical adversary model of systems that support giant-wimp isolation. Thus, an adversary could compromise the untrusted commodity OS (i.e., the giant) and can control some of its hardware resources (e.g., physical memory, device I/O ports). The compromised OS can directly attack SecApps (i.e., the wimps) or intentionally control or mis-configure any device (e.g., modify a USB device's address), including the I/O devices that it hands over to SecApps, on demand. Controlled or mis-configured devices may unwittingly perform arbitrary operations to breach a SecApp's I/O isolation, such as claiming USB transfers, and issuing Direct Memory Access (DMA) requests. In addition, a malicious or rogue SecApp may attempt to escalate its privilege by manipulating the interfaces with the I/O isolation system or configuring the SecApp's devices. It could also try to break application isolation (e.g., process isolation, file system controls), or even compromise OS execution and corrupt its data.

1.3 Security Challenges

In the giant-wimp isolation model, on-demand I/O channels offer ample opportunity for a giant to interfere with a SecApp's I/O operation and compromise its secrecy and integrity. One faces three key challenges in providing such channels.

I/O Channel Interference.

Given the fact that hardware resources and devices are dynamically shared by the giant (i.e., untrusted OS) and wimps (i.e., SecApps) on a time-multiplexed basis, the giant can mis-configure a device, or a transfer path to it, and compromise the secrecy and/or integrity of a SecApp's I/O. For example, most devices are interconnected by diverse bus subsystems (e.g., PCI, USB, Bluetooth, HDMI) in modern I/O architectures, which now become exposed to subtle isolation attacks; viz., the USB address overlap attack and the remote wake-up attack of Section 3.4.1. Hence, I/O channel isolation must now control the multiplexing of complex bus subsystems for different devices.

Mediation of Shared Access to Devices.

Further opportunities for interference arise from on-demand I/O; e.g., a rogue SecApp/untrusted OS may refuse to release the use of I/O resources shared with the untrusted OS/SecApp (e.g., shared interrupts) after I/O completion. Although both SecApps and untrusted OSes must have time-bounded, exclusive access to shared I/O resources and devices, they must be unable to retain unilateral control over shared I/O resources beyond time bounds specified by mediation policies for device access.

Verifiable I/O Codebase.

The opportunity for minimizing I/O kernel size and complexity created by the on-demand I/O isolation model (viz., Section 1.1) poses a significant design question. That is, if outsourcing of I/O kernel functions to the untrusted OS is possible only if the results of the outsourced functions can be verified correctly and efficiently by the kernel, which functions can be outsourced? Answering this question is important, since the trusted code minimization can be dramatic, as illustrated below.

Minimization of I/O kernel code base for verifiability reasons goes beyond the outsource-and-verify method. For example, device driver and bus subsystem code could be decomposed into modules that can be exported to applications, whenever the trusted I/O kernel can mediate the exported modules' access to I/O kernel functions and objects.

Finally, the composition of the TK with the rest of the TCB must not diminish the existing assurance; i.e., must not invalidate the TCB's security properties and their proofs.

2. System Overview

To fulfill all three security properties of on-demand isolated I/O systems, we define an add-on security architecture based on a trusted I/O kernel (TK), which composes with the underlying TCB, the untrusted OS, and SecApps. This section illustrates this architecture, and highlights the code base minimization methodology of the TK.

2.1 Platform

The present invention can include or be embodied as computer-readable instructions, processor micro-code, firmware, hardware, and other embodiments which, when executed, causes the processor to perform certain actions according to the present invention.

In one embodiment, the present invention includes a platform (as shown in FIG. 1), comprising:

1. One or more processors;
2. One or more devices. Multiple devices connected to the platform via chipset hardware and bus controllers (e.g., in one non-limiting example, USB devices are plugged to the USB bus controller, and then USB bus controller is wired to the southbridge, and connected to the processor and memory via northbridge and memory controller). Devices share chipset hardware and bus controllers.
3. Memory. Memory connected to the processor and including computer-readable instructions which, when executed by the processor, cause the processor to create a computing platform having four components:

(1) One or more untrusted operating systems (OSes), which can run one or more untrusted applications on top of the said OSes. The said OSes can be unmodified commodity OSes (e.g., Windows OS, Android) or special-purposed ones (e.g., hardened OS, security kernels) for bare-metal or virtualized environments, on, include but not limit to, computers, real-time systems, embedded systems and mobile platforms etc.

(2) An underlying Trusted Computing Base (TCB). The underlying TCB runs at the most-privileged level of the platform and is used to create isolated domains. Each isolated domain contains but not limited to: a unique domain identity, CPU contents, exclusively owned regions of memory, etc. Different isolated domains cannot access each others' memory and CPU contents. The underlying TCB partitions memory into three types of portions, one for the exclusive use of the underlying TCB, one for the exclusive use of the trusted I/O kernel (dubbed TK, described below) and one or more secure applications, and one for the exclusive use of the untrusted OSes and one or more untrusted applications. The underlying TCB could be in the form of, but not limited to, secure kernel, micro-hypervisor or hypervisor.

The underlying TCB may rely on certain root-of-trust hardware (e.g., Trusted Platform Module) to implement their security primitive. The underlying TCB employs at least three security primitives/services: (a) Memory access control: which isolated domain can access which memory region(s). (b) Device Direct Memory Access (DMA) access control: which device can perform DMA operation to the memory of which isolated domain. (c) Trusted Computing primitives: sealed storage and attestation root-of-trust. Sealed storage allows the primitive users to bind certain data with the identity of an isolated domain or domains, while attestation enables the primitive users to measure the identity of its isolated domain and report the measured identity to an external third party for verifying.

(3) A trusted I/O kernel (TK), wherein:

(3.1) The TK runs on top of the said underlying TCB, and runs in one or more different isolated domains (namely secure isolated domains) than the ones for the untrusted OSes and untrusted applications (namely untrusted isolated domains).

(3.2) The TK has at least the same privilege level as, if not higher than, the OS, including but not limited to the privileged level. And the TK has at least a lower-privileged level (including but not limited to unprivileged level) to run SecApps. The TK provides a subset of OS services (namely TK system calls) to the SecApps and the device drivers in the SecApps, such as, memory management, synchronization, interrupt isolation and delivery, and other OS utility libraries.

In some embodiments, the TK is mapped to the same isolated domain of the SecApps it protected. Each secure isolated domain contains exactly one TK mapping and exactly one SecApp. Each secure isolated domain exclusively occupies one CPU core during its lifetime. Thus, the number of SecApps can run concurrently is less than the number of CPU cores. In other embodiments, the TK runs in its own isolated domain, while SecApps communicate with the TK cross isolated domain boundary. In yet other embodiments, the TK can also be part of the underlying TCB domain, e.g., an extension to the underlying micro-hypervisor. In these two cases, the TK handles the scheduling of the SecApps, and perform context switches between different SecApps. Thus there is no limit on the number of SecApps can run.

(4) One or more trusted SecApps run on top of the said TK. A SecApp can exclusively use one or more SecApp owned devices (SecApp devices) and hence contain one or more SecApp device drivers.

2.2 Trusted Kernel (TK)

On top of the said platform, the TK can further comprise on-demand I/O channels isolation:

(1) The TK isolates I/O channels between SecApps' devices and the ones of the OS. The TK also isolate I/O channels between devices of different SecApps. I/O channels isolation means the data transferred between a SecApp and a SecApp device cannot be intercepted (secrecy violation) or tampered with (authenticity violation) by the untrusted OS domain, other SecApps or SecApp devices.

(2) The TK can dynamically change the ownership of the devices during the computing platform is running, without rebooting the system. The TK assigns an OS device to SecApp to fulfill the I/O requirement of SecApp, and protects this device as one of the SecApp device via I/O channel isolation. Later when the SecApp releases the SecApp device, the TK removes protection for this device and returns it back to OS.

Figure 2:
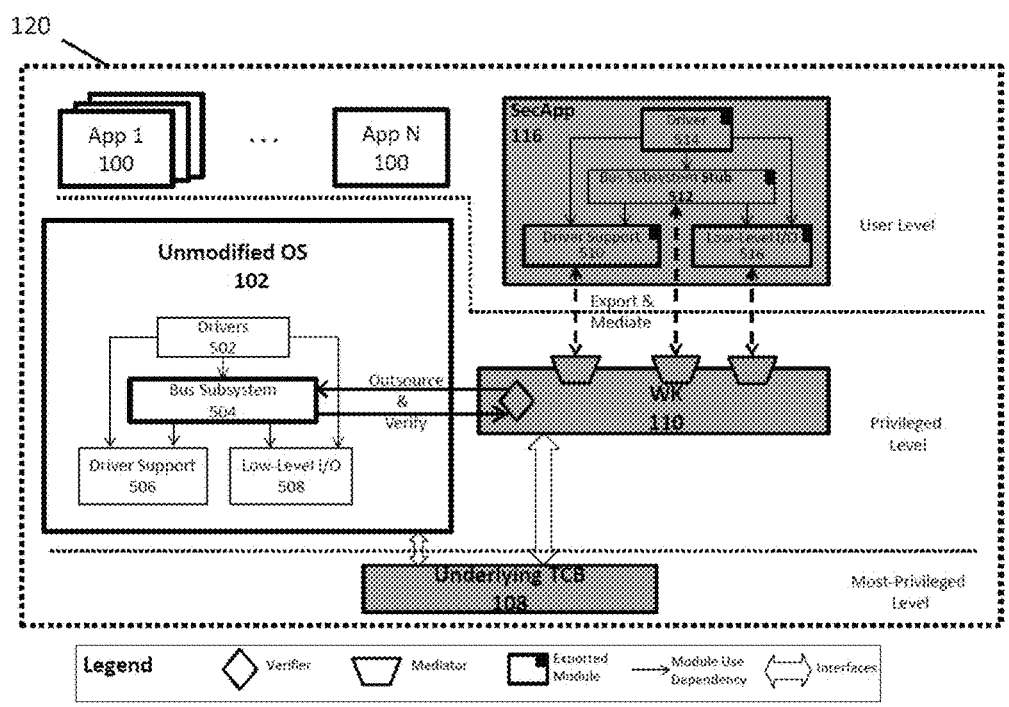
FIG. 2 shows the outsourced functions and exported code of the kernel.

(3) An untrusted plug-in of the untrusted OS (e.g., loadable kernel module, drivers) to provide various OS functionalities to the TK and SecApps, including but not limited to releasing the device control to the TK and configuring the isolated I/O channels (e.g., configuring chipset hardware and bus controllers) for the TK, After the plugin configured the isolated I/O channels, the TK verifies the configurations before assigning the I/O channels to the SecApps. The verification code in the TK is smaller and simpler than the I/O channel isolation configuration code (as shown in FIG. 2). The above mechanism is named "outsource-and-verify" in the present invention.

(4) The TK decomposes device drivers and bus subsystem code into modules that can be exported to SecApps. Depending on the types of the exported code, the SecApp may need to mediate the exported codes access to SecApp devices and makes sure that it won't violate I/O channels isolation. The mediation code in the TK is smaller and simpler than the exported code (as shown in FIG. 2). In a non-limiting example, the code of setting up the USB command data structure is exported to the SecApp, but the TK verifies only a few fields of the data structure (e.g., the USB Queue Head descriptor) to guarantee that the corresponding USB command only accesses the SecApps devices, not the devices of other SecApps or the OS. Note that the TK also comprises a procedure to load I/O access policy and enforce the policy on a particular SecApp's access to its devices. The above mechanism is named "export-and-mediate" in the present invention.

(5). The TK performs isolation of interrupts of SecApp device and the OS devices, and between the devices of different SecApp. The TK handles both non-shared and shared interrupts:

(5.1) non-shared interrupts represents the cases that each SecApp interrupt occupies a unique hardware interrupt number, or can be configured to occupy a unique interrupt number (e.g., by using configurable Message Signaled Interrupts). In this case, the SecApp owns the non-shared interrupts. The TK remaps the SecApp interrupts to the relevant SecApp isolated domain, by configuring interrupt controllers (e.g., IOAPIC and LAPIC in x86 APIC architecture and IOMMU with the interrupt remapping feature)

(5.2) If the SecApp interrupt shares an interrupt number with an interrupt of a device that belongs to other SecApps, the TK accesses the interrupt status registers of both devices to identify the interrupt source and delivers the interrupt to the corresponding SecApp.

(5.3) If the SecApp interrupt shares an interrupt number with an OS device interrupt, the interrupt is delivered to both the SecApp isolated domain and the OS isolated domain, the TK accesses the interrupt status registers of the SecApp device, if this is a SecApp interrupt, the TK delivers the interrupt to the SecApp and prevents OS from interfering with this interrupt delivery; if this is an OS interrupt, the TK prevents OS from holding up this interrupt so that the SecApp/TK cannot receive any subsequent interrupts with the same interrupt number.

(6) To facilitate the run-time communication between the TK and the OS, the TK provides bidirectional secure communication channels to the OS (TK-OS channels) without invoking the underlying TCB. In one nonlimiting example, the TK-OS channels can be used by the TK or a SecApp to outsource I/O functions to the OS during run-time. In another example, the OS can also use the TK-OS channels to request some security services from the protected SecApps. In one embodiment, on a multi-processor platform, the TK and the OS are running on different CPUs and they can notify each other using Interprocessor Interrupts (IPIs). The detailed communication messages are exchanged in a shared memory region of the TK and the OS, which is configured by the underlying TCB. The IPIs avoid the TK-OS isolated domain switches performed by the underlying TCB, which are typically more heavy-weight. For example, the IPI delivery incurs much less latency overhead than a VM switch performed by the underlying micro-hypervisor/hypervisor. Note that on uniprocessor platforms, the typical TK-OS isolated domain switches are used for TK-OS communication channels. In other embodiments, the TK-OS channels may use other approaches to share and/or exchange data among the TK/untrusted OSes/SecApps, such as, in non-limiting examples, listening on shared memory and exchanging cross-CPU signals. The TK can also provide APIs to the SecApps so that they can use the TK-OS channels.

(7) Similar to (6), the communication channels can also support the communication between different SecApps, and/or between SecApp and App.

On top of the said platform, the TK provides three procedures:

(1) the untrusted OS or applications register a SecApp via the underlying TCB and the TK. This process may include but not limited to (1a) the underlying TCB pauses the untrusted OS and the untrusted application (1b) the underlying TCB creates a new isolated domain, and maps including but not limited to the SecApp and SecApp device I/O resources into this isolated domain. In some embodiments, the underlying TCB may also map the TK in the same isolated domain with the SecApp. In other embodiments, the TK is mapped in a separate isolated domain from the SecApps. (1c) the underlying TCB transfers control to the TK, which further establishes virtual memory isolation, bookkeeps SecApp information (such as, in a non-limiting example, SecApp page table), initializes the SecApp, and uses the underlying TCB to enforce DMA access control. (1d) SecApp registration finishes and the underlying TCB switches isolated domain and transfers control to the original untrusted OS and untrusted applications.

(2) the untrusted OS or applications invoke a SecApp to run on top of the TK. This process may include but not limited to (2a) the underlying TCB pauses the untrusted OS and the user application. (2b) the underlying TCB switches to TK, which checks if the target invocation address is a valid entry of the SecApp by checking the bookkeeping SecApp information. (2c) If check passed, the TK executes SecApp from that target invocation address. (2d) Once finished execution, SecApp transfers control to the TK then to the underlying TCB, the underlying TCB transfers control to the original untrusted OS and untrusted applications.

(3) the untrusted OS or applications unregister a SecApp via the TK. This process may include but not limited to (3a) the underlying TCB pauses the untrusted OS and the user application, and switches to the TK. (3b) the TK removes the bookkeeping SecApp information, revokes memory region used by the SecApp, resets and releases SecApp devices. (3c) the TK switches to the underlying TCB to tear down the select isolated domain and maps corresponding memory and SecApp device I/O resources to one or more legacy isolated domains contain the untrusted OSes. (3d) the underlying TCB transfers control to the original untrusted OS and untrusted applications.

The TK further comprising verification algorithms to check the bus initialized by the untrusted OS and the relevant isolated I/O channels by the OS. Some non-limiting examples of computer buses contain PCI, USB, Bluetooth, NFC, and Firewire. In the following sections, two examples will be described:

(1) A PCI hierarchy verification algorithm
(2) A USB hierarchy verification algorithm 2.3 Discussion The TK is also an add-on trustworthy component, which is isolated from untrusted OS by the underlying TCB. It executes at least the same privilege level as, if not higher than, the OS. But it should be noted that in the present invention, the TK runs is less privileged than the underlying TCB. The TK dynamically controls hardware resources necessary to establish isolated I/O channels between SecApps and I/O devices, and prevents the untrusted OS from interfering with these channels and vice-versa. The TK leverages typical system techniques, such as CPU rings and page table permissions, to protect itself from the non-privileged SecApps. The SecApps incorporate modified, unprivileged device drivers to communicate with the isolated I/O devices, under the mediation of the TK. The underlying TCB, TK, and SecApp interactions for channel isolation are described in Section 5.

FIG. 1 shows that the TK must compose with three other system components. First, it must compose with the underlying TCB. The key goal of this composition is to retain the stable and formally verified properties of the underlying TCB; e.g., memory integrity and address space separation. Second, it must compose with the untrusted OS (giant) since the TK outsources its most complex functions to the untrusted OS, whenever it can efficiently verify their results, if its code base is to be small and simple. Third, it must compose with SecApps. This is because the minimization of its code base suggests that it should de-privilege and export some of its code (e.g., drivers) to SecApps whenever it can mediate all accesses of the exported code to I/O devices and channels under its control.

The composition of the TK with the underlying TCB has three important goals: it preserves the underlying TCB's wimp-giant isolation model; it avoids addition of new abstractions to the underlying TCB; and it retains the verifiability of the underlying TCB and its security proofs. First, the TK does not add any security primitives or services to the underlying TCB beyond those already required by the typical wimp-giant isolation model, which include physical memory access control, device Direct Memory Access (DMA) control, and sealed storage and attestation root-of-trust. Second, the TK does not require any new abstractions beyond SecApp registration/un-registration, which are already offered to the untrusted OS for wimp-giant isolation. These services rely on separation of the TK/SecApps and untrusted OS address spaces and physical memory, and preserve the memory isolation semantics of the underlying TCB. Third, the TK does not invalidate the underlying TCB's security properties and their proofs. For example, it does not add services and primitives that support I/O channels or virtualization. I/O channels include memory mapping operations that directly affect address-space separation and memory protection proofs, and interrupt processing that greatly complicates those proofs due to added concurrency. Hence, interrupt processing must completely bypass the underlying TCB and dynamically select handling procedures located in either the untrusted OS or the TK, depending on which system component controls the device at the time.

To assure the I/O channel isolation, TK needs to control all I/O hardware that is shared by SecApp devices with devices of the untrusted OS or another SecApp. A SecApp device could share the hardware controller and on-path hubs with untrusted-OS-controlled devices using this controller. However, to include all OS code that ordinarily controls shared I/O hardware in the TK would bloat its code base and substantially increase its verification effort.

To minimize the code base size and complexity of the TK, two classic methods of trustworthy system engineering were applied, namely outsource-and-verify functions and export-and-mediate code. However, neither method has been used for high-assurance, on-demand I/O isolation kernels for commodity platforms before. I/O isolation was either in security kernels for a few simple devices and not on demand, or was outside security kernels and not minimized for high assurance; viz., related work section. The present invention achieves significant code base reduction results using these two methods; i.e., we manage to cut down over 99% of Linux USB code from the TK, as shown in Section 4.

Outsource-and-Verify.

We decompose the bus subsystem functions, outsource them to the untrusted OS, and then efficiently verify the results of those functions; viz., FIG. 2. For example, in some embodiments related to USB subsystem, the untrusted OS initializes the USB hierarchy, which includes the USB host controller, hubs and devices, and configures the I/O channels for a specific SecApp device, whereas the TK verifies their correct configuration and initialization. Without verification, the untrusted OS could intentionally misconfigure the shared USB host controller and hubs, and violate I/O channel isolation in an undetectable manner. The verification code is much smaller and simpler than the bus subsystem code and various device drivers left in the untrusted OS, and relies only on generic host controller and hub operations, instead of the device-specific ones. In short, the outsource-and-verify approach enables the present invention to substantially decrease the code base of the TK and, at the same time, avoid reliance on the untrusted OS.

Export-and-Mediate.

The TK code base is further minimized by exporting device drivers and bus subsystem code to isolated SecApps which would otherwise have to be supported in the TK itself; e.g., the Bus Subsystem Stub of FIG. 2 denotes bus subsystem code exported by the TK to a SecApp. In Section 3.4.2, we illustrate how to export bus subsystem code using USB as an example. In particular, we show how different transfer descriptors for USB transactions are created for SecApps, and how the TK mediates the SecApp's use of these descriptors by checking the validity of a few isolation-relevant descriptor fields.

To export device driver and bus subsystem code to SecApps, the TK must identify and remove all code dependencies on the untrusted OS. To do this, the TK de-privileges the driver support code (e.g., memory management, kernel utility libraries) and mediates the SecApps' use of it, whenever necessary; viz. FIG. 2. Some code dependencies, including but not limited to, those of synchronization functions for device multiplexing, disappear in the on-demand I/O model and, while they no longer require de-privileging before export, they still require mediation after export. We illustrate how the TK performs driver support code exporting in Section 3.2. (SecApps can also outsource-and-verify driver functions (e.g., device initialization, power management) to the untrusted OS, and reduce their size and complexity). The present invention also de-privileges the low-level I/O code (e.g. MMIO, DMA, interrupts) and mediates the SecApps' use of interrupts. We illustrate how the TK perform interrupt isolation in Section 3.4.

Efficient TK-OS Communication.

The TK implements low-level communication primitives between SecApps and the untrusted OS, which are compatible with the unmodified OS; i.e., the OS is neither redesigned nor recompiled. At run time, SecApps can invoke untrusted OS services, such as file-system and networking services, whose results they can verify efficiently; e.g., using typical cryptographic functions. In some of the embodiments, these primitives are highly efficient because they use Interprocessor Interrupts and shared memory and avoid heavy-weight context switches with the underlying TCB. In other embodiments, especially on the single-core platform, the present invention uses shared memory and relies on the underlying TCB for isolated domain switching. We describe the design of the wimp-OS communication in Section 3.3, and illustrate its performance in the subsequent section (Best Mode of Implementation).

3. Trusted I/O Kernel Design 3.1 Scope and Generality

The design of the TK focuses on character-oriented I/O devices for three reasons. First, these devices are pervasive. One recent driver study, their drivers constitute about 52% of all Linux driver code and 57% of driver type. Second, these devices, such as video card, audio card, sensors, cameras, and user input devices, are important because they are responsible for connecting the software with the human users and the physical world. Third, the isolation of character devices is more complex than for storage and network I/O devices. The SecApps can safely outsource these functions of storage and network I/O devices to the untrusted OS. Specifically, SecApps can do this very efficiently using cryptographic outsource-and-verify techniques, whereby they use either authenticated-encryption or MAC modes to checksum and protect the integrity, and when necessary confidentiality, of the objects outsourced to untrusted OS services; e.g., files, databases, emails and other messages. Thus, the TK need not support any storage or network I/O device functions. However, character devices cannot be isolated using authenticated data encryption. The reasons are two fold: (1) the real-time data transferred in bytes by character devices is impractical to encrypt; (2) the commodity character devices typically lack key management and cryptographic capability for data encryption or authentication.

The minimization of TK code requires modular decomposition and our design relies on traditional decomposition methods for I/O kernel code; viz., FIG. 2. The outsource-and-verify method, which illustrated with the USB subsystem (Section 4.1), applies to all other bus subsystems with similar code size and complexity minimization results. This is the case because device initialization and configuration functions, which outsourced to the untrusted OS, comprise about 51% of driver code on average. Verification algorithms for the outsourced results are much simpler for all other subsystems (e.g., PCI, Firewire) than for the USB. For example, the verification algorithm for PCI bus is able to collect hierarchy information directly from the hardware registers of PCI bridges without having to derive it. For the Firewire bus, all bus bridges store routing information on how to reach a specific device, which can be directly accessed by the verification algorithm. In addition, for power management code (7.4% of driver code on average), verifying the power state of bus controller and hubs/bridges are general to any bus subsystem, because they comply with the widely accepted ACPI standard.

The export-and-mediate method follows classic trustworthy-system engineering principles (mentioned above). Although the security-sensitive operations may differ for different bus subsystems and devices, their identification is well understood. In the on-demand I/O isolation model, the present invention identifies all operations which, if misused by malicious or compromised SecApps, could violate the isolation I/O channels belonging to other SecApps or to the untrusted OS. The mediation code of the TK verifies that SecApp operations do not cross the isolation boundary of low-level I/O resources allocated to SecApp devices and is used by all devices and bus subsystems. For example, the TK performs simple range checks to ensure that a SecApp's operations only touch its own I/O ports, MMIO memory, and DMA memory. Mediation code also validates interrupt settings by comparing the interrupt vector, which is set by SecApps, with others set by the untrusted OS. The TK need not mediate SecApp operations that affect functional properties or availability of the isolated devices, which are more likely to have complex semantics of specific devices or buses. In addition, the method used to export driver-support code (e.g., low-level I/O, memory management, synchronization) to SecApps (Section 3.2) applies to all devices and buses. However, drivers for different types of devices and buses may have different dependencies on support code.

3.2 Exporting Driver Support Code

Aside from communicating with bus subsystems, device drivers also use a variety of services of untrusted OS subsystems; e.g., kernel library, memory management, synchronization, device library and other kernel services. Table 1 shows some non-limiting examples of such interfaces in each category and how we export them to minimize the code base of the TK, according to the on-demand I/O isolation model. Certain untrusted OSes may contain other types of driver support code. Thus in some embodiments, additional minimization decisions, or even different minimization decisions, are required to handle all these types accordingly.

TABLE 1

Minimizing driver support code in the TK

| Driver Support Code | | Minimization |
|---|---|---|
| Memory | Virt & phys Page | Exported to Mediated by |
| Synchronization | Locks | Exported to |
| | Threads | Exported to |
| | Signals | Exported to |
| Kernel | Utility | Exported to |
| | Timer | Exported to |
| Device ibrary | Class functions | Exported to |
| | I/O ports & | Exported to |
| | Config space & | Mediated by |
| Kernel | File system | Outsourced to |
| | CPU | Mediated by |

(1) Memory management interfaces are further divided into three types: virtual memory pages, physical pages, page permissions. Virtual and physical page management is done in SecApps, because during SecApp registration, memory (including the code, data and I/O memory) of SecApps is provisioned by the OS, and isolated by the underlying TCB and TK. The TK verifies that the OS provisions contiguous memory in both virtual and physical address spaces to the SecApps, so that the SecApps can easily perform page mapping translation. However, the TK sets page permissions for SecApps to prevent buggy or compromised SecApp code from subverting the TK's virtual memory isolation.

(2) Synchronization functions (e.g., locks, threads, and signals) are either unnecessary in the on-demand isolation model, or can be deprivileged to SecApps. First, locks (e.g., mutex, semaphore, conditional variable) that are used for multiplexing devices among different applications are unnecessary, because SecApps exclusively own their devices during execution. Locks for other usage can be easily implemented in user-level. Second, in some embodiments, SecApps may implement their own thread management and scheduling functions using user space thread libraries and timer interrupts delivered by TK, in other embodiments, TK provides thread scheduling for SecApps. Third, if multi-process is needed (Multi-thread is usually sufficient for SecApps that exclusively own their CPUs during execution), in some embodiments, SecApps manage the signals between their processes, using user-space signal implementation. In other embodiments, TK provides process scheduling and inter-process communication/signaling accordingly.

(3) Kernel library for utilities, timers, debugging and book-keeping are unprivileged and can be replaced by user-level libraries in SecApps. In some non-limiting examples, SecApps manage their own timers, because TK delivers timer interrupts to SecApps.

(4) Device library include routines supporting a class of device and other low-level I/O related functions. Device-class functions are now placed in SecApps, similar to device drivers. Low-level I/O resources such as I/O ports, MMIO and DMA memory are already isolated by the TK, thus the SecApps directly manage them without any run-time mediation by TK. However, configuration space access code (e.g., changing MMIO base address registers, modifying Message Signaled Interrupt Capability) and interrupt management functions (e.g., acknowledging End of Interrupts register, enable/disable interrupts) exported to SecApps should be mediated by TK, because this code could be exploited by malicious or compromised SecApps to breach I/O channel isolation.

(5) Kernel services include code for driver interaction with other OS subsystems, such as file systems and CPU scheduling. File system functions are outsourced to the OS by SecApps, using the TK-OS communication channels of TK (discussed below). Multi-process CPU scheduling, if needed, is implemented in SecApps. However, the TK needs to sanitize the new process page tables created by SecApps during forking processes, and mediates page table switches.

(6) Others. In other embodiments, the TK may provide other driver support code to the SecApps, for some non-limiting examples, debugging interfaces or error handling procedures. These types of driver support code is relevant to the code and I/O isolation of SecApps, thus it is better to include them in the implementation of TK.

3.3 TK-OS Communication

The TK-OS communication channels enable bidirectional communication between the untrusted OS and the TK or SecApps. In a non-limiting example, a SecApp can request extra memory from the OS, when it runs out of the memory provisioned. The TK contacts the relevant OS services, and verifies that the dynamically assigned memory regions returned by the OS services are valid (e.g., they do not overlap with the memory regions of other SecApps).

In some non-limiting examples, the untrusted OS can use these TK-OS channels to protect itself from potential buggy SecApp behavior or defend against privilege escalation attacks from malicious SecApps. When the OS invokes the SecApps, it places upper bounds on the SecApps' resources. If a SecApp exceeds these bounds, the OS requests the TK to take appropriate action. TK verifies these requests using the resource accounting information it keeps during SecApp execution. In another non-limiting example, if the OS detects a potentially deadlocked SecApp (e.g., which holds a CPU in excess of an established time bound), it notifies TK with the total running time as an input message. TK verifies this request by calculating the elapsed time of the SecApp, using the CPU time stamp it records during SecApp invocation and the current time stamp. If the total running time is correct, TK then notifies the SecApp to prepare for a descheduling. If the SecApp acts normally in descheduling, it can still be invoked by OS later. However, if the SecApp fails to deschedule for a certain amount of time, the untrusted OS can request the TK to terminate the SecApp. Similarly, in another example, an OS plug-in (e.g., a loadable kernel module) can constantly monitor shared interrupts of OS' devices. If it discovers that a shared interrupt with a SecApp is blocked for a long time, it could also complain to TK using TK-OS communication channels.

The present invention designed primitives for TK-OS communication, which are compatible with standard commodity OS implementations. Especially, in an example embodiment on top of multicore platform, when a SecApp requests OS services, it invokes TK-provided interfaces, instead of directly triggering high-weight context switches coordinated by the underlying micro-hypervisor. This yields substantially better performance for fine-granularity protection than that offered by security/separation kernels, recent micro-hypervisors, and traditional hypervisor designs. We demonstrated its efficiency in Section 4.5. Specifically, the SecApp provides an OS service number, inputs, and a completion call-back function to TK. In some embodiments, the TK signals the OS running on other CPUs using Interprocessor Interrupts (IPIs), which is a standard facility of the Local Advanced Programmable Interrupt Controller (LAPIC) in main-stream multi-processor CPUs. It is frequently used to coordinate multi-processor bootstrap, but we use this capability to send an interrupt to other processors where the OS executes, as a signal of service requests. Before sending the IPIs, TK places the SecApp-provided inputs in a dedicated memory region shared with the OS, which is established by the micro-hypervisor during SecApp registration. After IPIs are sent, TK transfers control back to the requesting SecApp, and the SecApp continues to perform other operations. Later, the OS sends an IPI to TK to signal the service completion, and returns service results using the shared memory region. The TK verifies the service results and passes them to SecApp. In other embodiments, the TK-OS channels may use other approaches to share and/or exchange data among the TK/untrusted OSes/SecApps, such as, in non-limiting examples, listening on shared memory, or passing cross-processor signals. In some embodiments, especially for the single-core platform, the TK-OS channels may also rely on the underlying TCB for isolated domain switching, and use other mechanisms to perform this TK-OS communication. In the embodiments for single-core platform, the TK-OS communication channel includes isolated domain switch in synchronized communications, or not include isolated domain switch immediately in asynchronous communications.

3.4 Interrupt Isolation and Delivery

The TK needs to isolate both non-shared and shared interrupts. The SecApp device interrupts are remapped to the TK first. The TK decides the source of the interrupts, delivers them to the destinated SecApp if the interrupts are for SecApp, handles them if the interrupts are for the TK, or safely clears them if the interrupts are for the untrusted OS(es) (mainly in the case of shared interrupts). The implementation of interrupt delivery to the SecApp depends on the implementation of isolation domains of the SecApp and the TK. In one embodiment, the TK is mapped to the isolated domain of the SecApp. The TK can deliver interrupts to SecApp as signals (similar to signals in commodity OSes). In other non-limiting embodiments, the TK resides in a different isolated domain from the SecApp. The TK delivers interrupts to SecApp using cross-domains communication primitives, such as IPCs or our TK-OS channels.

Non-Shared Interrupt Isolation.

Each SecApp interrupt occupies a unique hardware interrupt number, or can be configured to occupy a unique interrupt number if the SecApp device uses non-shared interrupts. To isolate non-shared interrupts, the TK remaps the SecApp interrupts to the relevant SecApp isolated domain, by using their interrupt numbers and SecApp device information (e.g., the bus/device/function number of a PCI device).

Shared Interrupt Isolation.

At least one of the SecApps devices shares an interrupt number with an interrupt of a device that belongs to other SecApps or the untrusted OS.

To isolate shared interrupts with other SecApps, the TK receives the interrupts, decides the interrupt sources by reading some interrupt status registers of the devices of both SecApps, and delivers the interrupts to the destinated SecApp.

To isolate shared interrupts with the untrusted OS in some embodiments on multicore platform to isolate shared interrupts with the untrusted OS, the TK performs extra steps in step (3) of the FIG. 5(b). These extra steps include, but are not limited to: 1. the TK enables the interrupts to be routed to one or more cores running the untrusted OS (named OS cores), and one or more cores going to run the SecApp (named SecApp cores). 2. the TK sets up a handler for the interrupt on each of the named SecApp cores. Also, the untrusted plug-in in the untrusted OS sets up a handler for the interrupt (named dummy interrupt handler) on each of the named OS cores. Thus, both the OS and the TK are able to receive interrupts on this shared interrupt line. The dummy interrupt handler in the OS is used to gracefully acknowledge the interrupts of the SecApp and prevent attacks from a compromised or malicious SecApp (e.g., the SecApp holds up the interrupts so that the OS cannot receive interrupts of its own devices). During the SecApp is running, when a shared interrupt arrives, the TK and the plug-in in the untrusted OS performs the following steps to achieve interrupt isolation and delivery:

(1) The TK accesses the interrupt status registers of the SecApp device and decides which device triggers the interrupt. If none of the SecApp device triggers the interrupt, the interrupt should be handled by the untrusted OS, otherwise it Should be handled by the TK.

(2a) If the interrupt should be handled by the untrusted OS, the TK sets up a timer (named Tos). This step ensures that the TK does not signal an end-of-interrupt (EOI) to the interrupt controller until the OS signals an EOI.

(2b) If the interrupt should be handled by the TK, the dummy interrupt handler in the agent module sets up a timer (named Twimp). This step ensures that the untrusted OS does not signal an EOI until the TK signals an EOI. The value of Twimp is independent from the value of Tos.

(3a) If the interrupt should be handled by the untrusted OS. The untrusted OS handles the interrupt normally according to the OS original design. Then go to step (5a).

(3b) If the interrupt should be handled by the TK, in some embodiments, the TK performs the following non-limiting steps to deliver the interrupt to the SecApp: 1. the TK saves SecApp execution context. 2. resumes SecApp execution from certain entry, to let SecApp handle the interrupt. 3. after the SecApp handled the interrupt, the TK restores the previously saved SecApp execution context. In other embodiments, the TK may hint the SecApp about the interrupt arrival by modifying SecApp state. In this case, the SecApp is responsible to check its own state and handle the interrupt timely.

(4a) If the interrupt should be handled by the TK, after the SecApp serves the interrupt, the TK should perform additional non-limiting steps to ensure safely interrupt isolation. In some embodiments, the TK may check device interrupt status before signaling EOIs for the SecApp. In other embodiments, the TK bookkeeps interrupt information, such as, but not limited to, number of times, and frequency. The agent module of the untrusted OS may also bookkeeps the interrupt information for this shared interrupt line. If the interrupts are too frequent, it will complain this fact to the TK. At the TK side, if the number complained by the untrusted OS/other SecApps matches the TKs number, the TK will take action as the untrusted OS/other SecApps required, including but not limited to, terminating the SecApp.

(5a) If the interrupt should be handled by the untrusted OS, the TK sends EOI when Tos is expired.

(5b) If the interrupt should be handled by the TK, the dummy interrupt handler in the agent module sends EOI when Twimp is expired.

TABLE 2

Decomposition of bus subsystems.

| (6) Tos | Design |
|---|---|
| Bus | Outsourced |
| Power | Outsourced |
| Informatio | Removed |
| Device | Removed |
| Request | Exported to |

The present invention may include certain mechanisms to decrease the waiting time in step (2a) and step (2b). In some embodiments, mechanisms are used to decrease Tos and Twimp initial values. In other embodiments, mechanisms are used as another source of timeout decisions, along with or replace Tos and Twimp.

In other embodiments on single-core platform, the interrupt isolation mechanism is different. The shared interrupts are delivered to the TK first. If the interrupts are for the SecApp, the TK delivers the interrupts and sets up Twimp. If the interrupts are for the OS, the TK delivers the interrupts to the untrusted OS, which triggers the underlying TCB to switch the isolated domains from the TK to the OS. In some embodiments, the TK delivers the interrupts to the untrusted OS by invoking the OS's interrupt handler directly. It some other embodiments, the TK delivers the interrupts to the OS by triggering a self-interrupt on the CPU interrupt controller with a different interrupt number. The OS plug-in handles the self-interrupt by relaying the interrupt to the original OS interrupt handler.

4. Decomposing Bus Subsystems

The present invention includes a method of decomposing the bus subsystem, including but not limiting to PCI, USB, Bluetooth, Firewire, NFC, HDMI, and Thunderbolt, using the proposed outsource-and-verify, and export-and-mediate approaches. The bus subsystem usually implements a variety of I/O functions such as bus enumeration, power management, device-information bookkeeping and the virtual file system (VFS) presentation to user-level application, device hot-plug, and request handling. The present invention applies the outsource-and-verify and the export-and-mediate approaches to decompose this subsystem and include only necessary code in the TK. Some example results are summarized in Table 2.

The outsourced functions include but not limited to the bus enumeration function isolated I/O channel preparation, and power management functions. For bus enumeration function isolated I/O channel preparation, the present invention designs simple and efficient verification algorithms in the TK to verify the OS's configuration of the bus hierarchy and isolated I/O channels. The TK's verification algorithm will verify the configurations of the on-path controller and intermediate hubs and the isolated device in the bus enables the desired isolated channel. For example, all relevant devices (including controllers and hubs) must have correct device address and the devices are connected to each other as indicated by the untrusted OS. The low-level I/O resources (e.g., I/O ports, MMIO memory, DMA memory, interrupts) assigned to the isolated devices do not conflict with any other device in the same bus. Moreover, the configurations of other devices in the same bus will not violate the I/O data secrecy and authenticity of the isolated channel. In addition, the TK must also have persistent protection of the verified bus configurations and detect or prevent any attack that could modify the verified configurations. We will illustrate the outsource and verification of bus enumeration and I/O channel preparation using two bus subsystems, USB in Section 4.1 and PCI in Section 4.3.

For the outsourced power management functions, the TK can efficiently verify the power status and prevent the OS from selectively disabling the bus hierarchy and compromising I/O data integrity of SecApps.

The present invention exports some functions to the SecApps, including but not limited to the request handling code. The request handling module of the a commodity bus subsystem accepts the requests from device drivers of SecApps, generates request descriptors or other data structures, executes the requests directly via low-level I/O resources or submits the request descriptors to bus controller hardware to perform relevant bus transactions. The TK exports most of the request handling module to the SecApps and mediates the behaviors of the exported code. For one non-limiting example, the TK verifies a few fields in the SecApp-generated descriptors to ensure that the SecApps' use of device I/O resources does not violate I/O channel isolation. We will use an example in USB request handling to illustrate the methodology (Section 4.2).

In addition, the TK removes a large portion of the bus subsystem, according to our unique on-demand I/O isolation model. For some non-limiting examples, device information bookkeeping and virtual file system services become unnecessary, because the TK manages only a few devices for SecApps on-demand. Instead, user-level SecApps include the device drivers and directly access their devices, without any file-system representation. Also, the device hot-plug is excluded from the TK because, in the on-demand I/O isolation model, the OS can handle the hot-plug event first and then switches to the SecApps. The SecApps do not deal with hot-plugged SecApp devices.

4.1 Verifying the Outsourced USB Bus Enumeration

USB subsystem is chosen to illustrate the TK design of bus subsystem decomposing and code minimization method for two reasons. First, the USB bus is very popular in terms of device connectivity. For example, in Linux, 35% of device drivers use USB and 36% PCI; 10% of higher-level protocol drivers use either. Second, channel isolation for the USB subsystem is the most complex since it mixes control and data channels, and uses (untrusted) software to maintain the device hierarchy and initialize device addresses (in versions earlier than USB 3.0). There is no direct hardware information about the device address and bus hiearchy for the TK to verify. We will illustrate two non-limiting attack examples in the following paragraphs to demonstrate the complexity of USB bus. In contrast, channel isolation for all other subsystems (e.g., PCI) is much simpler. For example, they already have separate control channels: some (e.g., PCI, Firewire) store hierarchy information in hardware, and others (e.g., Bluetooth and HDMI) have hardware-assigned device addresses. These channel control components can be directly accessed and protected by the TK.

Address Overlap Attack.

Figure 3:
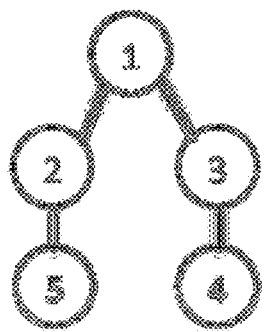
FIG. 3 shows USB Address Overlap and Remote Wake-up Attacks. Legend: The root of the USB bus denotes the USB host controller, the leaves the USB devices, and the intermediate nodes the USB hubs. The number of each tree node denotes the USB device address. The dotted nodes represent the USB devices whose addresses are duplicated in an attack. The grey node denotes the USB device that is suspended by the untrusted OS and can be remotely woken up using external signals (e.g., a special packet sent to a USB Ethernet card).
Figure 3:
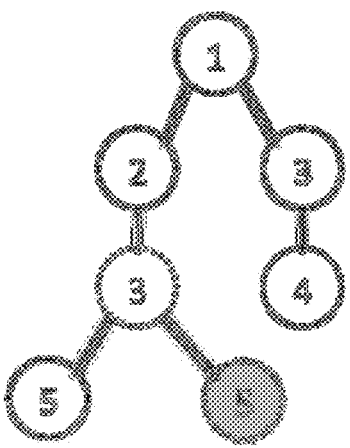

A compromised OS can intentionally create duplicate addresses for various devices or hubs in the USB hierarchy, as is shown in FIG. 3. The ultimate purpose of this type of device misconfiguration is to surreptitiously compromise the SecApp I/O data, as illustrated below.

A device with a duplicate USB address can hide from the TK during hierarchy verification, if it responds to control transfers from the TK (e.g., reading device descriptors) slower than the SecApp device whose address it duplicates. However, the hidden device ("hidden dev") may still intercept or respond to other types of USB data transfers faster.

Thus the hidden device can be directed to compromise both I/O data secrecy and integrity of a SecApp device with the same address.

Remote Wake-Up Attack.

A subtle attack can be launched by USB devices in suspended state which can still respond to external wake-up signals (e.g., a special packet sent to a USB Ethernet card) and resume their active state. Taking advantage of this remote wake-up feature, a compromised OS can configure a hidden dev, suspend it to evade verification, and later resume it to launch a "USB address overlap attack". However, we note that the remote waking up of a device needs to be coordinated by an upstream, non-suspended USB hub. In a more potent attack, the OS could configure the hub upstream of the suspended device as a hidden dev (e.g., the dotted node No. 3 in FIG. 3), which would hide the remote wake-up event from the TK. Thus, to defend against this subtle attack, the TK verifies (1) that only the hubs that connect the SecApp device to the host controllers are in non-suspended state during SecApp execution, (2) that there is no hidden hub in the hierarchy, and (3) the status of all non-suspended hubs to detect any remote wake-up signals.

Proof-of-Concept Experiments.

We experiment with the USB address overlap attack, and analyze its impact on I/O channel isolation. Note that USB device communication has two directions: IN means data is transferred from device to host controller, while OUT represents the opposite. There are four types of data transfer: control, interrupt, bulk, and isochronous. Each type has different latency and bandwidth guarantees, and is performed by different types of USB devices.

We perform the analysis using two keyboards; one is Dell SK8115, as the SecApp device, the other one is Dell L100, as a device controlled by the adversary. We changed the USB address of Dell L100 to overlap that of Dell SK8115. In the experiment, when performing control transfer IN direction communication (e.g., reading device descriptors), Dell SK8115 always replies faster, so we only read its device descriptors from the host controller. Dell L100 is hidden from the control software (e.g., verification software, SecApps). However, when performing control transfer OUT direction communication (e.g., sending command to light the caps-lock LED on the keyboard), we discovered that the caps-lock LEDs on both keyboards are always lighted together. This means the hidden Dell L100 can silently intercept control OUT data of the isolated-channel device, which breaks the secrecy of the I/O channel. Moreover, if we perform interrupt control IN communication (e.g., reading keyboard input), key-presses on both keyboards are accepted normally, which means that the hidden Dell L100 can inject data into the isolated channel and break its integrity.

In summary, the USB device address overlap attack can break both the secrecy and integrity of isolated I/O channels, without being noticed by any control software.

Hierarchy Verification Algorithm.

The purpose of the verification algorithm is to check that only the USB paths of the SecApp devices are in active state under a USB host controller. Here a USB path denotes a chain of USB devices from the host controller, via the on-path hubs, and to a specific SecApp device.

To design this algorithm, we need to overcome several challenges as the result of the complexity of USB bus. For instance, the USB hierarchy information about USB address and hub-device connectivity is maintained only in the bus subsystem software of the untrusted OS. There is no hardware-stored hierarchy information that can be directly used by the TK. When discovering the hierarchy information, the TK must communicate with the USB devices using common operations instead of device-specific ones (to minimize code size and complexity). In addition, the TK must not interfere with the normal functions of the I/O hardware being verified; e.g., it must not make un-recoverable configuration changes.

In the on-demand isolation model, the untrusted OS prepares a set of USB paths for all SecApp devices, and provides them as inputs to the TK verification algorithm. Specifically, the OS backs up the state of all non-USB-path devices, suspends them, and passes the USB path information to the TK. The USB path information includes the addresses of all devices and on-path hubs, and the ports of their upstream hubs that they connect to. The TK protects the host controller so that the untrusted OS can no longer issue any USB command via this host controller. The TK then executes the following algorithm to verify the OS-prepared USB paths:

(1) TK periodically monitors the port status of all on-path hubs to detect remote wake-up events. If any is detected, the verification fails. The present invention does not require this step prior than other steps. This step can also take place after step 2, step 3, or step 4.

(2) TK examines all hub ports that do not have any downstream SecApp device. These ports should either be disabled or suspended. Otherwise, the TK suspends those ports.

(3) TK scans all the device addresses (e.g., 127 addresses possible for USB 2.0). If it detects any that are active non-USB-path devices, the verification fails.

(4) For each device in USB path, TK suspends it, and then communicates using its address. If there is any reply, a hidden dev or hub is detected, and verification fails.

Extensions to Support Multiple SecApps.

The same USB hierarchy may be shared by multiple SecApps. The above algorithm is used for the first SecApp. For the subsequent applications, the present invention adds the following two preliminary steps before running the algorithm.

(1) TK notifies the previously registered SecApps and suspends their USB paths.

(2) TK activates the USB paths of the requesting SecApp.

Step (1) is necessary, because the USB paths activated in (2) may have hidden devices that conflict with the devices in the USB paths of the previous SecApps.

Algorithm Analysis.

In this section, we present an informal analysis of the algorithm and argue that it prevents both the USB address overlap and remote wake-up attacks; in this analysis we assume the step 1 is prior than the step 2.

We first analyze that Steps 1 to 3 are able to find out all non-USB-path devices that are still in active state. The untrusted OS may attempt to hide a device when the TK scans it in Step 3, and remotely wake it up later. However, the remote wake-up event of a device must be coordinated by a non-suspended hub. This hub is either be a non-USB-path hub, or a hub on a USB path. For the former the TK will always discover it in the linear scan, and for the latter the remote wake-up event will be detected by the TK, as shown in Step 1.

Although Steps 1 to 3 guarantee that all non-suspended devices have correct addresses are on the USB paths, this does not prove that the given USB paths are correct, because hidden devs (or hubs) may still be on USB paths. Step 4 can rule out any hidden dev that is on a different USB-path with the targeted device whose address the hidden dev duplicates, but it cannot detect the hidden dev that is on the same USB-path with the targeted device ("same-path hidden dev").

We now provide a informal correctness argument on a proposition that the untrusted OS cannot configure any "same-path hidden dev" that manages to evade the TK verification and compromise the SecApp I/O data isolation later. To be "meaningful", the same-path hidden device must either be able to intercept/fake messages between the host controller and the targeted device, or it must have suspended devices that are hidden downstream and can be remotely woken up later.

Before continuing with the argument, we need to make four observations on USB 2.0 specification. First, a non-malicious device/hub in its Configured state will not respond to SET Address commands, unless it is deconfigured by a SET Configuration command and transits back to Address state. Second, if a hub is in the deconfigured state, all its downstream devices lose power and transit back to the Attached state, which is similar to resetting all downstream devices. Third, the remote wake-up capability is disabled by default, and can only be enabled when the device/hub is in its Configured state. Forth, a hidden device downstream to its target device cannot affect the message secrecy and integrity of the target device, because the target device always receives and responds to USB transactions faster than the downstream hidden device.

Our informal correctness argument is as follows: If the untrusted OS intends to configure a hidden device to duplicate the address of its upstream device, the SET Configuration command to the hidden device is always intercepted by the upstream device, thus the hidden device can never transit to the Configured state, and thus "meaningless". If the untrusted OS sets a hidden device to duplicate the address of its downstream device, the hidden device must first be deconfigured, and thus all downstream devices will lose power and all their configurations. The hidden device itself becomes "meaningless". In conclusion, the hierarchy verification algorithm can prevent both the USB address overlap and remote wake-up attacks.

The two main advantages of the USB hierarchy verification algorithm are as follows: (1) it only uses a few standard operations of the USB host controller and hubs; (2) it does not use the driver of any other device that shares the same USB bus with the SecApp device. Note that some USB host controller and hubs may have device-specific operations that can violate the I/O channel isolation. For example, some host controllers or hubs may be configured to record a few of their latest data transfers for debugging purpose. This feature may be abused by the untrusted OS to reveal some secret data of a isolated I/O channel. The algorithm should verify the configurations of these device-specific operations. One could develop an automatic device specification checker to scan through the open specifications of all host controllers and hubs and to identify the sensitive device-specific operations. For devices that have no open specifications, there is no guarantee that we can use some black-box fuzz testing technique to identify the sensitive operations. Thus the verification algorithm should warn the users of the isolated I/O channels about the potential risks. Users that have higher security concerns can choose to avoid these devices on their platforms. This is one example of how users adapt the I/O isolation system for different usage models that could have various levels of security requirements.

4.2 Mediating the Exported USB Request Handling

Figure 4:
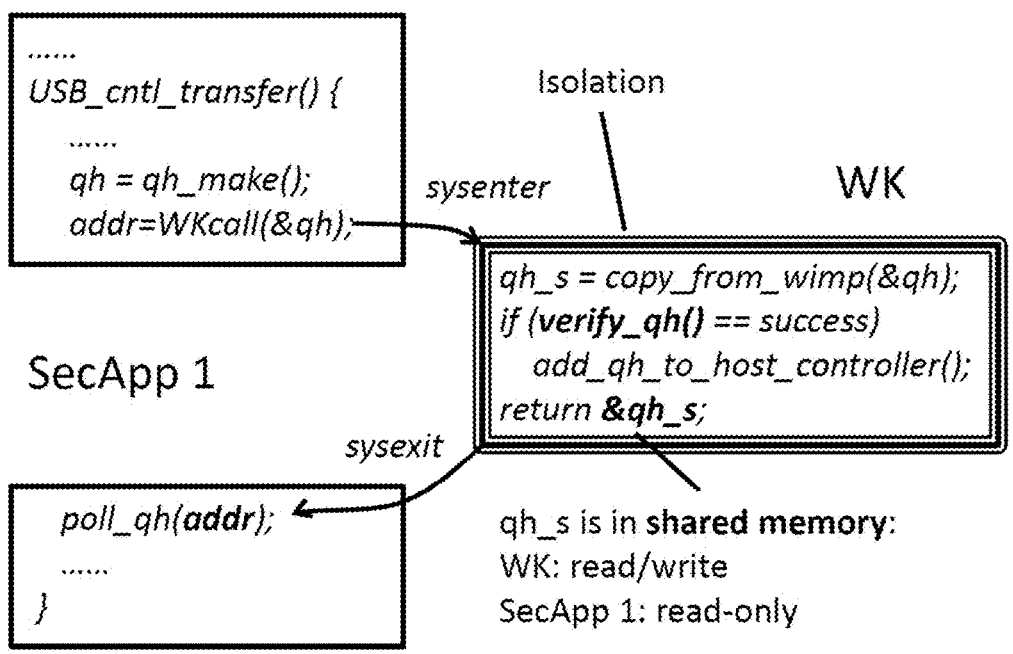
FIG. 4 shows USB Transfer Descriptor Verification by the kernel

In the present invention, most of the USB device operation module is deprivileged and pushed to the SecApps. TK only verifies the behavior of the SecApps that may affect SecApp isolation from the untrusted OS. For example, as shown in FIG. 4, if a SecApp intends to perform certain operations to its device, it generates a set of transfer descriptors qhs. However, it cannot directly add descriptors to controller hardware, which is controlled by the TK. Instead, the SecApp invokes the TK using a system call like interface (TKcall) with the descriptors qhs as input. The TK copies the descriptors to its kernel space, verifies them, and submits the valid descriptors to the host controller hardware. In some embodiments, the TK places the copied descriptors in a shared memory area to allow efficient descriptor status polling by the SecApp. In other embodiments, the TK provides TKcalls to the SecApp for accessing certain fields in the descriptor, including but not limited to the status area.

In this outsourcing model, the SecApps bookkeep their USB transfer information, and fill a large amount of other descriptor fields. The TK only needs to verify a few security-critical descriptor fields to verify that SecApps filled them correctly. The principle of verification is that those fields in the descriptors do not affect the isolation of the SecApps' devices and other devices controlled by the TK and the untrusted OS. The TK does not verify descriptor fields that only affect the availability of the SecApps' devices. In addition, the verification algorithm of the security-sensitive fields are general and simple, without complicated bus-specific semantics. In some non-limiting examples, the TK performs simple range checking on the Buffer Pointer fields in the descriptors, and makes sure that these fields point to the SecApps' DMA memory region Similar checking also applies to other bus subsystems in the present invention. The next section presents the details of USB transfer descriptor verification.

4.3 Verifying the Outsourced the PCI Bus Subsystem

PCI Control and Data Channels.

PCI devices have a set of device-agnostic registers referred to as "Configuration Space" which contain standard device information, data channel configurations and some vendor-defined feature information.

The Configuration Space of a device can be addressable by knowing the 8-bit PCI bus number, 5-bit device number and 3-bit function number (a.k.a. BDF bus/device/function). The bus number is decided during bus enumeration and its information is stored in some special registers of PCI host bridge and other intermediate bridges (e.g., PCI-to-PCI and PCI-to-PCIx bridges). The device number depends on how the device is interconnected to its direct upstream bridge, either hardwired or plugged-in to a expansion slot. The function number depends on the device hardware design. By specification, the Configuration Space of a PCI device should be accessible in any power state, except for D3cold. Devices resuming from D3cold always go through a power-on reset. Software must then re-initialize the device to put it into the working state. This rules out the time-of-checking-to-time-of-use attack.

Among the register information contained in the Configuration Space, the Base Address Registers manage the assignment of device I/O ports and MMIO memory and Interrupt Line and Pin registers are relevant the delivery of the device interrupts. Capabilities Pointer register may point to a linked list of new capabilities implemented by the device, some of which may be related to the I/O data transfer of the device. For example, Message Signaled Interrupt (MSI) or MSI-X capability has registers that specify the software-defined interrupt number, type and destinations. Slot Identification capability identifies a PCI bridge that provides external device expansion slots. Power Interface capability shows the power status of the device. In addition, Expansion ROM base address points to the option ROM that may contain device firmware code or configuration information. However, option ROM is commonly used by storage, network, and video devices to perform device initialization during system bootup.

For a PCI bridge, its Configuration Space contains some special registers that are relevant to the connection of different PCI buses and the forwarding of I/O port and memory access. For example, Primary Bus Number, Secondary Bus Number, and Subordinate Bus Number stand for the number of the upstream, direct downstream, and the farthest downstream bus of the bridge, respectively. The I/O Base and Limit, Memory Base and Limit, and Prefetchable Memory Base and Limit registers defines the range of I/O ports, memory, prefetchable memory of all devices downstream to the bridge, respectively.

Hierarchy Verification Algorithm.

Before running the algorithm, the TK should protect the device Configuration Space from modifying by the untrusted OS. The algorithm starts from the PCI host bridge, which is Bus 0, and iterates through every possible device in this bus (from Device 0 to Device 31). The algorithm should consider the following conditions: (1) if the device is a PCI device, the algorithm verifies that the I/O port and memory are in the correct range and do not conflict with those of other devices that are already checked. The algorithm also verifies the interrupt setting is correct. This verification should be performed on each possible function of the device. (2) If the device is a PCI bridge, the algorithm verifies the I/O port, memory, and interrupt setting, similar to a PCI device. The algorithm also checks that the Primary Bus Number, Secondary Bus Number, and Subordinate Bus Number are correctly set. The algorithm then perform a depth-first iteration on the Secondary Bus, with the I/O port, memory, prefetchable memory range set in the Configuration space as the verification metrics. This verification should be performed on each possible function of the bridge. (3) If the device is a Slot for plug-and-play devices, the algorithm should verify Slot Identifier. (4) If the device does not exist, proceeds to the next device.

PCI Express (PCIe).

The algorithm to verify a PCI Express bus is very similar to the PCI algorithm. PCI Express switches contain multiple ports to connect to different devices. Each port is a virtual PCI-to-PCI bridge. Thus the PCI Express hierarchy is similar to the PCI hierarchy, but each bridge only connects to one device.

5. System Life Cycle

Figure 5:
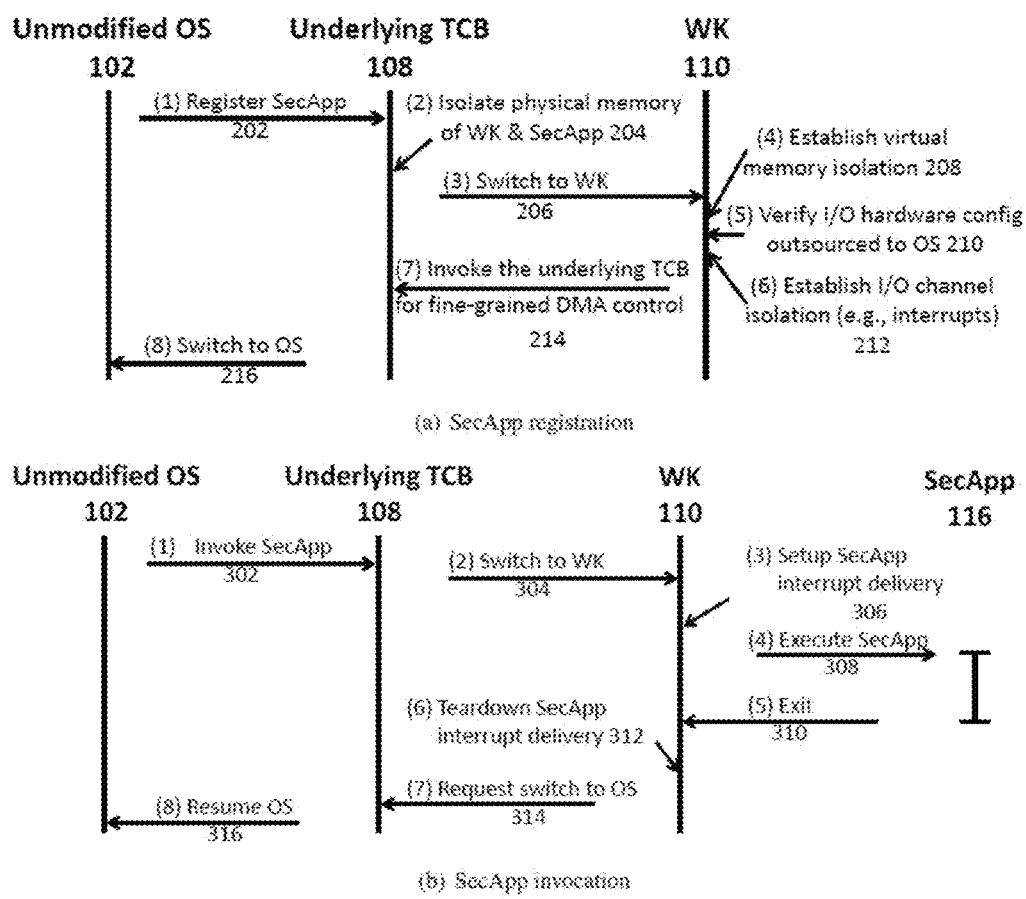
FIG. 5 shows the life cycle of a SecApp

This section illustrates the life cycle of isolated I/O channels and the interactions between the underlying TCB, the TK and the SecApps, as shown in FIG. 5.

Registration.

The untrusted OS or untrusted application provisions the memory (including but not limited to, stack and heap) and SecApp I/O resources (including but not limited to, MMIO memory, DMA memory) required by a SecApp, and explicitly registers the SecApp through the underlying TCB's interface. The registration procedure including the following non-limiting steps: The underlying TCB isolates the SecApp's memory and I/O resources, isolate physical memory of the TK and SecApp, and transfers control to the TK. The TK creates the virtual address page table of the SecApp, verifies the configurations of the SecApp devices and necessary hardware, and establishes the isolated I/O channels for the SecApp devices (except for the interrupt delivery). Until unregistration, the untrusted OS can no longer tamper with the memory regions and I/O resources of the registered SecApps. In some embodiments, the TK may map itself in the same address space with the SecApp. In other embodiments, the TK may reside in a different isolated domain from the ones for SecApps.

Invocation.

The SecApp is invoked implicitly or explicitly. In some embodiments, the OS/user application implicitly invokes the SecApp by executing one of the SecApp's entry points. While in other embodiments, the OS/user application explicitly requires the underlying TCB and/or the TK to execute one of the SecApp's entry points. The underlying TCB detects this execution and switches the context to the TK. The invocation procedure includes the following non-limiting steps. The TK establishes the TK-OS channels for the SecApp, sets up the SecApp interrupt delivery, and then begins executing the requested entry points at the SecApp's privilege level (or the said user-level). Upon finishing execution, the SecApp suspends its devices and transfers control to TK. The TK disables the TK-OS communication channels and wimp device interrupt delivery, and then the underlying TCB takes control and performs a context switch to the OS. Between invocations, the OS can run other applications, but cannot use the wimp devices or tamper with the SecApp. Note that the SecApp could be invoked for arbitrary times after registration, and the invocation is efficient, because most I/O configuration overhead has already been offloaded to registration.

Unregistration.

Upon unregistration, The TK performs the following non-limiting steps: 1. resets the wimp devices to a clean state. 2. tears down the isolated I/O resources of the SecApp with the help of the underlying TCB. 3. restores the configurations of the shared I/O hardware, and returns the CPU, memory regions and I/O resources of the SecApp to the OS.

Preferred Embodiment

1. The Underlying TCB

In one embodiment, the present invention works on x86 micro-architecture with multi-cores and uses micro-hypervisor as an example of the underlying TCB. Micro-hypervisor runs at the most-privileged level of the platform and can create multiple isolated domains. Micro-hypervisor also fulfills all the required properties listed in the previous section. In the best mode of implementation, the present embodiment adds two more interfaces in the underlying TCB: registration of the TK and unregistration of the TK.

2. The TK

The present embodiment implements the TK that provides on-demand I/O channel isolation to USB 2.0 devices using the Enhanced Host Controller Interface (EHCI) host controller driver, and adds the USB hierarchy verification and transfer descriptor (TD) verification algorithm. The present embodiment uses x86 fast system call instructions to implement TKcall for secure applications. Also, the present TK uses IPIs and shared memory to implement TK-OS channels.

2.1 USB Hierarchy Verification

The hierarchy verification algorithm only requires a few standard operations, including PCI configuration space operations to access EHCI host controller registers, and basic USB control and interrupt transfer operations to access registers of USB hubs, via the host controller. The control and interrupt transfers are much easier to configure than the other two USB transfers (i.e., bulk and isochronous) and require smaller TCB.

In Step 1 of the algorithm, TK monitors remote wake-up events by setting periodic interrupt transfers to the port status endpoints of all on-path hubs. The endpoint data contains a bit to indicate that the hubs have coordinated a wake-up event. This type of event is always be detected by the periodic checking.

In Step 2, TK scans through all device addresses by sending standard SET Configuration commands to each address. By specification, every USB device supports at least a default configuration No. 1, thus an active device should always respond to a SET Configuration=1 command. The present embodiment uses this command, because its USB transaction does not have a data stage and introduces less latency overhead. A non-malicious USB device should always acknowledge this command within 50 ms. If a scanned device address does not exist, the command will return an error immediately.

In Step 3, TK suspends an on-path hub or SecApp device by sending a SET Feature command to the upstream hub port that the hub/device connects to. If the upstream hub is the root-hub, TK directly accesses the port status registers of the host controller using PCI read command. After a device is suspended, TK finds out hidden devices by sending a SET Configuration command to the same address device.

2.2 USB Transfer Descriptor Verification

There are four different types of descriptors specified in USB 2.0, namely Queue Head (QH), Isochronous Transfer Descriptor (iTD), Split Transaction Isochronous Transfer Descriptor (siTD) and Frame Span Traversal Node (FSTN). QH contains zero or more Queue Element Transfer Descriptors (qTD).

The TK exposes seven interfaces to SecApps, in two categories: attach QH, attach iTD, attach siTD and attach FSTN for submitting descriptors; reactivate qTD, reactivate iTD and reactivate siTD for reactivating the executed descriptors. FSTN descriptors need not be reactivated.

For the first four interfaces, TK verifies the following fields of the descriptors: the Device Address fields in QH, iTD, and siTD, to assure that the addresses refer to the correct SecApp device; the Buffer Pointer fields in qTD, iTD, and siTD, to make sure that the addresses point to the SecApp's own DMA memory region; a few other fields that lead to undefined operations if configured incorrectly, such as the Maximum Packet Length field in QH and iTD, the Total Bytes to Transfer field in siTD, and the Typ field in FSTN.

2.3 The TK Interfaces

The present embodiment implements the TKcall interface using the standard x86 Fast System Call instruction (SYSENTER for requesting TK services, and SYSEXIT for the TK to switch to the SecApp, both after serving syscalls and when invoking the SecApp). Parameters (e.g., service ID, pointers to input/output data structures) are passed by registers. Alternatives like SYSCALL/SYSRET and "int 0x80" work, but SYSENTER/SYSEXIT is widely available on x86 platform and is more efficient.

For the TK-OS channels, TK triggers an IPI by programming the interrupt command register (ICR) of LAPIC to specify the IPI vector number and delivery destination. The delivery status bit of ICR indicates whether the IPI is sent.

On the receiving CPUs, the IPIs are delivered as normal edge-triggered interrupts. The IPIs are used as notifiers of TK-OS communication. The real data, including but not limited to, service request ID and input/output parameters, is passed by shared memory buffer, which is established during SecApp registration, by the underlying micro-hypervisor.

3. Evaluation

The present embodiment is built and evaluated on an off-the-shelf HP Elitebook 8540p with a Dual-Core Intel Core i5 M540 CPU running at 2.53 GHz, 4 GB memory; a Hitachi GST Travelstar 7200 rpm 500 GB SATA-II disk; an Intel 82577LM Gigabit network card; and an Infineon v1.2 TPM. The machine is also equipped with two USB 2.0 host controllers and two immediate downstream rate matching hubs for transforming high-speed USB transactions to low-speed ones. The machine runs a 32-bit Ubuntu 12.04 OS with Linux kernel 3.2.0-36.56. The SecApp tested is a prototype that includes a USB keyboard device driver. In all network experiments, the machines are connected via 1 Gbps Ethernet links.

4. Code Base Size Evaluation

As shown in Table 3(a), the present embodiment adds 660 SLoC to the micro-hypervisor for SecApp registration and unregistration. The code addition does not invalidate any security properties of the underlying TCB. The code base of the underlying micro-hypervisor is much smaller than full functioning VMMs/hypervisors.

Table 3(b) shows the code base break-down of the present TK prototype. The TK code size is about 3.6K SLoC, 60% of which is USB bus subsystem relevant code. This code base is sufficient to support all types of USB 2.0, 1.1, and 1.0 devices, and all types of USB transfer mode, such as control, interrupt, bulk and isochronous transfers.

Table 4 compares the TK USB software stack to the commodity Linux one (Both only support USB EHCI host controller). In the best mode of implementation, the TK includes only 2144 SLoC of the USB subsystem code, which represents more than 99% reduction compared with the over 22K SLoC of Linux USB code base. Note that the reduction result in practice is even better, because a significant number of third party USB drivers and drivers relevant to high-level protocols (e.g. SCSI drivers for USB flash drive) are not included. In addition, the USB hierarchy verification algorithm and transfer descriptor verification algorithm only use 93 and 107 SLoC, respectively.

TABLE 3

System code base size

| (a) Micro-hypervisor | | (b) The WK | |
|---|---|---|---|
| Modules | SLoC | Modules | SLoC |
| Registration | 447 | USB Subsystem | 2144 |
| Unregistration | 213 | WKcall | 249 |
| Underlying TCB | 24551 | WK-OS Channel | 106 |
| Total | 25211 | Others | 1038 |
| | | Total | 3537 |

TABLE 4

Comparison of code size in USB software stack between TK and in Linux.

| | TK | | | Linux | |
|---|---|---|---|---|---|
| Verification Hierarchy | TD | Others | Totl | USB | USB |
| 93 | 107 | 1944 | 2144 | 19820 | >206376* >226196* |

*We calculate only the USB drivers included in the Linux kernel tree.

TABLE 5

Latency break-down of the USB hierarchy verification algorithm.

| | Step | Step | Step 3 | Step | Total |
|---|---|---|---|---|---|
| Time | 0.29 | 0.54 | 573.03 | 1.32 | 575.18 |

TABLE 6

Latency comparison of TK-involved and hypervisor-involved context switches.

| | TKcall | TK-OS | Hypercall | Page |
|---|---|---|---|---|
| Time | 0.38 | 0.23 | 7.56 | 20.68 |

TABLE 7

Latency of SecApp life-cycle operations.

| | Registration | Invocation | Unregistration |
|---|---|---|---|
| Time | 583.79 | 0.26 | 0.97 |

5. Micro-Benchmarks

USB Hierarchy Verification.

Table 5 shows the latency of each step in the USB hierarchy verification algorithm. Among them, device address scanning (step 3) dominates the latency overhead. However, this overhead is acceptable, because this algorithm is only invoked once per SecApp registration, and does not affect the more frequent SecApp invocations.

USB Transfer Descriptor Verification.

The latency overhead of TD verification is negligible. For example, verifying a QH and an iTD only takes about 0.28 μs and 0.42 μs, respectively. In comparison, a micro-frame, the minimum time unit in USB specification, takes 125 μs.

TK Interfaces.

Table 6 illustrates the latency overhead of two main TK interfaces; i.e., the TKcalls for communicating with SecApps, and the IPI-based TK-OS channels for communicating with the OS. These two interfaces avoid the more heavy-weight underlying TCB involved context switches and greatly improve overall system performance. Hypercalls and hardware page faults are the two most widely used methods of triggering micro-hypervisor involved context switches. In comparison, TK calls are about 20 times faster than hypercalls and 54 times faster than page faults. The TK-OS channels in the present embodiment are 33 times faster than hypercalls and 90 times faster than page faults. In addition, using the asynchronous TK-OS channels, the SecApps and TK do not block waiting for the OS services.

System Life-Cycle Operations.

Table 7 presents the latency overhead of the registration, invocation and unregistration of a SecApp. The latency of SecApp invocation and unregistration are much smaller than those of registration, because the more heavy-weight hardware configuration verification is only invoked during registration.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

We claim:

1. A system for providing input/output channels to a secure application, comprising:
   one or more processors;
   one or more input/output (I/O) devices, said devices in communication with at least one of said processors; and
   memory, connected to said one or more processors and including computer-readable instructions which, when executed by one of said processors, cause the processor to create a computing platform having:
      one or more untrusted operating systems;
      a trusted computing base;
      a trusted I/O kernel; and
      a communications channel between said untrusted operating system and said trusted I/O kernel;
      wherein a secure application is executed on top of the trusted I/O kernel;
      wherein the untrusted operating system configures an I/O device for use by the secure application and releases the configured I/O device to the trusted I/O kernel;
      wherein the trusted I/O kernel verifies the configuration of the released I/O device and assigns the I/O device to the secure application; and
      wherein the trusted I/O kernel provides channel isolation between the secure application and the I/O device.

2. The system of claim 1 wherein said trusted computing base creates one or more isolated domains, each of said isolated domains comprising:
   processor contents; and
   one or more regions of memory, said regions of memory being for the exclusive use of said isolated domain.

3. The system of claim 2 wherein said trusted computing base partitions memory into a plurality of portions comprising:
   a portion for the exclusive use of said trusted computing base;
   a portion for the exclusive use of said trusted input/output kernel and one or more secure applications; and
   a portion for the exclusive use of said one or more untrusted operating systems and one or more untrusted applications.

4. The system of claim 3 wherein said trusted I/O kernel runs in a first isolated domain.

5. The system of claim 4 wherein said secure application runs in a second isolated domain.

6. The system of claim 3 wherein said trusted I/O kernel and said secure application run in the same isolated domain.

7. The system of claim 4 wherein each of said one or more secure applications includes one or more device drivers and further wherein each of said one or more secured application has exclusive use of an I/O device associated with said device driver.

8. The system of claim 7 wherein said trusted kernel decomposes said device drivers and exports portions of said device drivers to said secure applications for execution.

9. The system of claim 8 wherein data transferred between said secure application and said I/O device cannot be intercepted or altered by said untrusted operating system, by other secure applications or by other I/O devices.

10. The system of claim 1 wherein said trusted I/O kernel provides isolation of interrupts generated by I/O devices assigned to a secure application.

11. The system of claim 2 wherein said trusted computing base performs the functions of:
   creating an isolated domain;
   mapping a secure application to said isolated domain;
   mapping I/O device resources required by said secure application to said isolated domain; and
   transferring control to said trusted I/O kernel.

12. The system of claim 1 further comprising a plug-in to said untrusted operating system, said plug-in performing the functions of configuring I/O devices for use by the trusted I/O kernel and releasing control of said I/O devices to said trusted I/O kernel.

13. The system of claim 1 wherein said trusted computing base runs at a highest privilege level of said computing platform.

14. The system of claim 2 wherein said trusted computing base relies on a trusted platform module to implement a security primitive.

15. The system of claim 14 wherein said trusted computing base employs a plurality of security primitives, including:
   controlling which of said isolated domains can access which memory regions;
   controlling which device can perform direct memory access operations to the memory of said isolated domain; and
   performing sealed storage and attestation root-of-trust.

16. The system of claim 15 wherein said sealed storage allows binding of data with the identity of one or more isolated domains.

17. The system of claim 15 where said attestation root-of-trust allows measurement of an identity of an isolated domain and reporting of the measured identity to a third party for verification.

* * * * *